United States Patent [19]
Tantam

[11] 3,765,705
[45] Oct. 16, 1973

[54] VACUUM-INSULATED PIPELINE
[75] Inventor: Donald Harry Tantam, Cheam, England
[73] Assignee: The British Oxygen Company Limited, London, England
[22] Filed: Jan. 6, 1971
[21] Appl. No.: 104,443

[30] Foreign Application Priority Data
Jan. 7, 1970  Great Britain.................... 831/70

[52] U.S. Cl.................... 285/47, 138/114, 138/148, 285/138
[51] Int. Cl. .......................... F16l 59/16, F16l 55/00
[58] Field of Search.................... 137/561 A; 285/47, 285/138, 150, 155, 156; 138/114, 148

[56] References Cited
UNITED STATES PATENTS
3,360,001  12/1967  Anderson.......................... 285/47 X
497,536  5/1893  Cummings...................... 138/114 X
3,068,026  12/1962  McKamey...................... 285/138 X
2,930,407  3/1960  Conley............................ 138/148 X
1,140,633  5/1915  Trucano.......................... 138/148 X Primary Examiner—Herbert F. Ross
Attorney—Dennison, Dennison, Townshend & Meserole

[57] ABSTRACT

A vacuum insulated pipeline for transfer of fluid at extreme temperatures, for example liquid oxygen, formed from jacketed portions of pipeline, junction pieces and protective sleeves for the junction pieces. The jackets and the spaces between the junction pieces and protective sleeves are evacuated.

8 Claims, 2 Drawing Figures

Patented Oct. 16, 1973

INVENTOR
DONALD H. TANTAM
BY
ATTORNEYS

VACUUM-INSULATED PIPELINE

FIELD OF THE INVENTION

This invention relates to a vacuum-insulated pipeline and to a method for its construction.

Vacuum-insulated lines are important in the transportation of fluids having a temperature substantially above or below ambient temperature. This invention relates to a novel form of vacuum insulated line characterised by being particularly easy to construct and maintain.

SUMMARY OF THE INVENTION

According to the invention there is provided a vacuum-insulated assembly for the transfer of a fluid at a temperature substantially above or below ambient temperature, including a plurality of prefabricated jacketed members each made up of a tubular pipeline and a coaxial tubular jacket, the jacket being attached in fluid tight manner to the tubular pipeline to provide an insulating space, and arranged alternately with tubular junction members having substantially the same cross section as the tubular pipeline, each prefabricated jacketed member having joined to it two tubular sleeves, one at each end of the jacketed member, the tubular sleeves being of larger internal diameter than the external diameter of the jacketed members and being arranged to provide an insulating space around the portions of the pipeline not enclosed within a tubular jacket, and the insulating spaces being evacuated.

The jackets in the prefabricated jacketed members include a cylindrical section and two annular end pieces. Preferably the annular end pieces are cup-shaped with the cups located either inside or outside the cylinder. This assists the assembly in withstanding stress resulting from differential expansion of the pipeline and jacket and in providing a longer heat-leakage path from the jacket to the pipeline. For ease of consturction the tubular pipeline preferably projects beyond the end pieces of the jacket.

Preferably all parts of the assembly are constructed of metal, stainless steel being particularly suitable, and preferably all the joints in an all-metal assembly are welded joints.

For convenience the sleeves and the jackets can be provided with fitted pump-down connections to allow easy evacuation and the jacketed members can if desired be evacuated before being transported to the construction site.

The junction member will be either an unbranched or a branched tube according to whether a particular prefabricated jacketed member is joined at the end in question to one or more than one other prefabricated jacketed member. All parts of the assembly except junction members are preferably substantially straight, bends in the asembly being provided, if required by the junction members. Where a jacketed member is joined at either end in a straight line to only one other jacketed member either two cylindrical sleeves can be provided for the junction and can be directly welded end to end and to the jackets or one cylindrical sleeve can be provided and can be directly welded to the jackets. Where a jacketed member is joined at either end to more than one other jacketed member or to a curved junction member the ends of the sleeves must be shaped to form a close fit with each other so as to allow a firm welded joint.

The prefabricated tubular jacketed members are preferably all of a standard cross section and the sleeves preferably have an internal diameter only slightly larger than the external diameter of the jacketed members so as to allow for ease of welding. If required, however, a collar can be provided between the jacketed member and the sleeve and welded to both of them. Some form of expansion member, for example a bellows, will normally need to be included in either the jacket or the pipeline.

Preferably the tubular junction members, and any projecting portions of the prefabricated jacketed members, are provided with layers of superinsulating material. This is particularly important if the fluid to be transported in liquid hydrogen or liquid helium. The superinsulation can be prepared in advance in rolls of assembled layers for ease of installation.

A getter is also preferably provided in the evacuated spaces, particularly if liquid hydrogen or liquid helium is the fluid to be transported.

The invention also provides a method of constructing a vacuum-insulated assembly which comprises joining prefabricated jacketed tubular members, each made up of a tubular pipeline and a coaxial tubular jacket providing an insulating space, alternately to tubular junction members having substantially the same cross section as the tubular pipe line and then joining tubular sleeves to the jacketed members to provide insulating spaces around the portions of the pipeline not enclosed within a tubular jacket, the tubular sleeves being of larger internal diameter than the external diameter of the jacketed members, and evacuating the insulating spaces.

Such a method can be effected by firstly installing the prefabricated jacketed members, shaping the sleeves, positioning the sleeves around the jackets leaving space to insert the junction members, inserting the junction members, welding them to the pipelines, inserting superinsulation if required, sliding the sleeves into the insulating position and finally securing them by welding.

The assembly provides a vacuum-insulated line for the transport of high temperature or low temperature fluids and has been found to be particularly suitable for transporting low temperature liquefied gases, for example, liquid oxygen.

It provides the advantage that the prefabricated jacketed members can be prepared in advance, transported to the site where the assembly is to be constructed and the assembly can then be readily put together on site. The lines can be made up from units of standard length and diameter. This offers the further advantage that lengths of line can easily be removed and replaced and that lengths of pipeline which are no longer required is one assembly are easily recoverable for use elsewhere. Extension of the line, or additional take-off points, can readily be provided if required.

The invention will now be described with reference to the accompanying figures in which.

Figure 1:
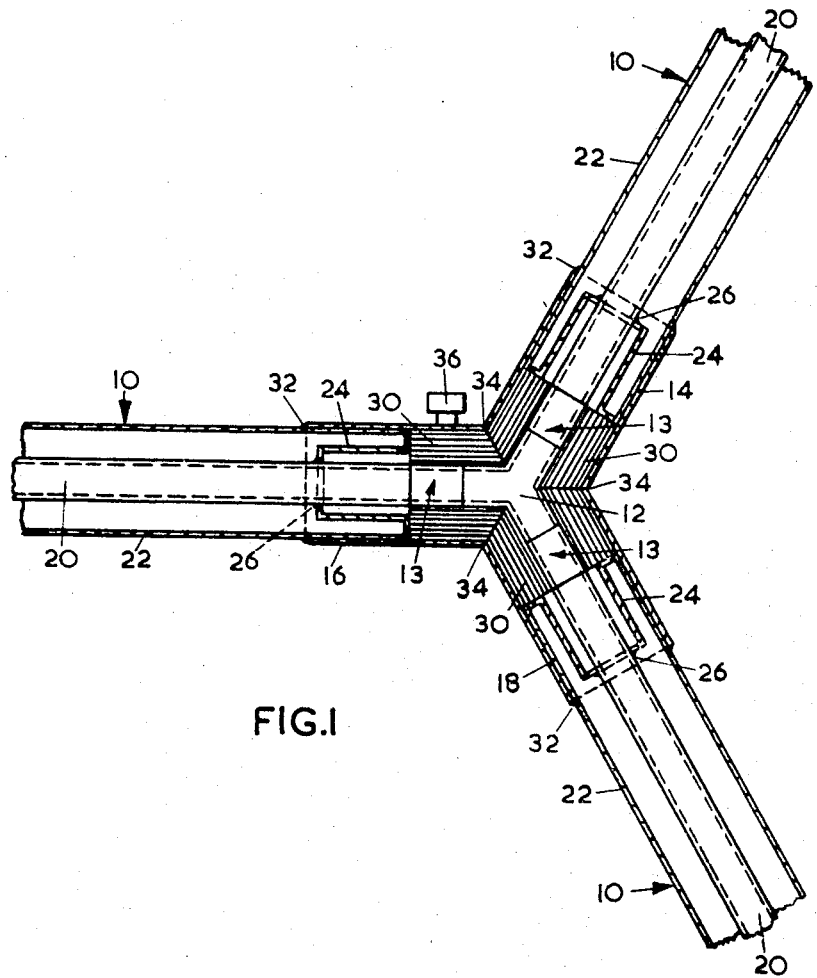
FIG. 1 is a sectional view of part of an assembly according to the invention. The section is taken through the axes of the component parts.

In the assembly shown in FIG. 1, all parts of which are constructed of stainless steel, three jacketed tubular members 10 are joined together by branched junction member 12 and sleeves 14, 16 and 18.

Figure 2:
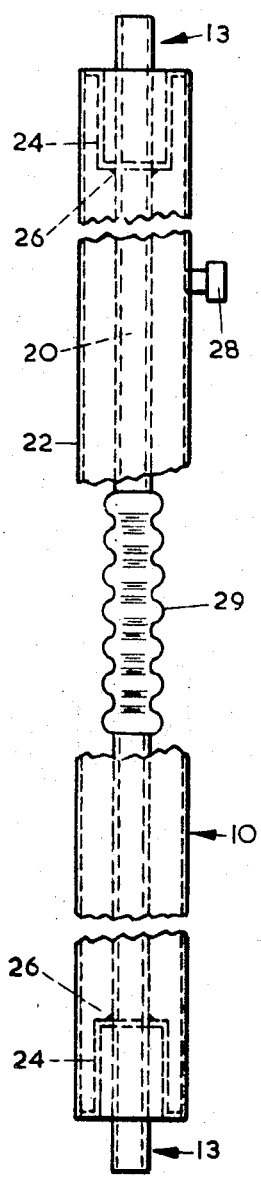
FIG. 2 is a side elevation of a jacketed tubular member according to the invention.

The jacketed tubular members 10 (also shown in FIG. 2) have a central pipeline 20 and a jacket 22, the jacket 22 being attached to the pipeline 20 by cup-shaped end portions 24, the joins being annular welds at the point indicated by the numeral 26. Each jacket 22 is provided with a pump-down connection 28, and with an expansion bellows 29.

Layers of superinsulation 30 are provided around the arms of junction member 12 and around the projecting portions 13 of the pipelines 20.

The sleeves 14, 16 and 18 are joined to the jackets by welds 32 and to each other at welds 34 formed between the shaped ends of the sleeves. Sleeve 16 is provided with a pump-down connection 36 to permit evacuation of the space enclosed between the sleeves and the junction member 12.

In constructing the assembly, the jacketed members 10 are first secured in the desired position, the junction member 12, with branches at the required angle, is fabricated and tried in position but is then removed to allow sleeves 14, 16 and 18, shaped to fit with each other and to be a sliding fit with the jackets 22 to be placed around jackets 22. The junction member 12 is then welded into position and enclosed within layers of superinsulation 30. The sleeves 14, 16 and 18 are then slid together and welded to each other and to the jackets 22. Care should be taken to ensure that all welds are leak-tight. Finally a vacuum pump is applied to pump-down connections 28 and 36.

It is of course necessary to terminate such an assembly, at one or both ends, in a vessel such as a storage vessel, and it is then necessary to make a suitable connection with the vessel. One method of making this connection is to weld a flange to the wall of the vessel and to the jacket 22.

We claim:

1. A vacuum-insulated assembly for the transfer of a fluid at a temperature substantially above or below ambient temperature, including a plurality of prefabricated jacketed members each made up of a tubular pipe line and a coaxial tubular jacket, the jacket being attached in fluid-tight manner to the tubular pipeline to provide an insulating space, with tubular junction members having the same cross section as the tubular pipeline and joined to the ends of said pipeline each prefabricated jacketed member having joined to it two tubular sleeves, one at each end of the jacketed member, the tubular sleeves being of larger internal diameter than the external diameter of the jacketed members and being arranged to provide an insulating space around the portions of the pipeline not enclosed within a tubular jacket, and the insulating spaces being evacuated.

2. An assembly as claimed in claim 1, wherein each prefabricated jacketed member has cup-shaped annular end pieces.

3. An assembly as claimed in claim 2, wherein the tubular pipeline projects beyond the end pieces of the jacket.

4. An assembly as claimed in claim 1, wherein all the joints are welded joints.

5. An assembly as claimed in claim 1, wherein the sleeves and the jackets are provided with fitted pump-down connections.

6. An assembly as claimed in claim 1, wherein all parts of the assembly except junction members are substantially straight.

7. An assembly as claimed in claim 1, wherein the sleeves have an internal diameter only slightly larger than the external diameter of the jacketed members.

8. An assembly as claimed in claim 1, wherein the tubular junction members are provided with layers of superinsulating material.

* * * * *